(12) United States Patent
Sumiyoshi (10) Patent No.: US 8,448,213 B2
(45) Date of Patent: May 21, 2013

(54) CONTENTS DISTRIBUTION SYSTEM, CONTENTS DISTRIBUTION SERVER, CONTENTS REPRODUCTION TERMINAL, AND CONTENTS DISTRIBUTION METHOD

(75) Inventor: Yasuaki Sumiyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 1436 days.

(21) Appl. No.: 11/775,024

(22) Filed: Jul. 9, 2007

(65) Prior Publication Data

US 2008/0010660 A1    Jan. 10, 2008

(30) Foreign Application Priority Data

Jul. 10, 2006 (JP) .................................. 2006-189670

(51) Int. Cl.
*H04N 7/173* (2011.01)
(52) U.S. Cl.
USPC .......................................... 725/105; 725/107
(58) Field of Classification Search
USPC .................................................. 725/105, 107
See application file for complete search history.

(56) References Cited

U.S. PATENT DOCUMENTS

| 7,680,808 B2 * | 3/2010 | Onoda et al. ........... 707/999.102 |
| 2001/0047517 A1 * | 11/2001 | Christopoulos et al. ........ 725/87 |
| 2003/0204613 A1 * | 10/2003 | Hudson et al. ................ 709/231 |
| 2004/0103150 A1 * | 5/2004 | Ogdon et al. ................ 709/205 |
| 2008/0320151 A1 * | 12/2008 | McCanne et al. ............. 709/228 |

FOREIGN PATENT DOCUMENTS

| JP | 2003244695 A | 8/2003 |
| JP | 2003-304286 A | 10/2003 |
| JP | 2004186793 A | 7/2004 |
| JP | 2005-94578 A | 4/2005 |
| JP | 2005333478 A | 12/2005 |
| WO | 02/39323 A2 | 5/2002 |

OTHER PUBLICATIONS

Office Action issued Oct. 11, 2011 from the Japanese Patent Office in counterpart Japanese application No. 2006-189670.
Communication dated May 1, 2012 from the Japanese Patent Office in counterpart Japanese application No. 2006-189670.

* cited by examiner

*Primary Examiner* — Pankaj Kumar
*Assistant Examiner* — Franklin Andramuno
(74) *Attorney, Agent, or Firm* — Sughrue Mion, PLLC (57) ABSTRACT

Provided is a contents distribution system including: a unit for dividing contents data stored in a contents distribution server into segments and distributing the contents data segments, the contents data being reproducible for a predetermined period of time; a unit for distributing the contents data segments by varying sizes of the contents data segments in accordance with contents processing information notified by a contents reproduction terminal; a unit for receiving and storing the contents data segments distributed by the contents distribution server and reproducing the same in real time; and a unit for notifying the contents distribution server of the contents processing information indicating a processing status of the contents data segments distributed.

21 Claims, 7 Drawing Sheets

CONTENTS DISTRIBUTION SYSTEM, CONTENTS DISTRIBUTION SERVER, CONTENTS REPRODUCTION TERMINAL, AND CONTENTS DISTRIBUTION METHOD

This application is based upon and claims the benefit of priority from Japanese Patent Application No. 189670/2006 filed on Jul. 10, 2006, the disclosure of which is incorporated herein in its entirety by reference.

BACKGROUND OF THE INVENTION

1. Field of the Invention

The present invention relates to a contents distribution system, in particular, a system for distributing through streaming digital contents data such as music data or moving image data which is reproducible for a predetermined period of time, such that the digital contents data can be reproduced in a terminal in real time.

2. Description of the Related Art

Due to the development of a large-capacity communications network and the advancements in transmission technology in recent years, moving image distribution services are provided for personal computers and mobile telephones. According to the moving image distribution service, data is provided by a streaming method in which the data is received and stored mainly by the reception terminal side while being reproduced in real time, and a data transmission protocol therefor adopts a real-time transport protocol (RTP) as described in Japanese Patent Laid-open Application Publication No. 304286/2003 (hereinafter, referred to as "related art") According to the RTP, data is reproduced in a reception terminal without regard to a packet which has been lost during the transmission or a packet which has arrived late. In the case of the moving image reproduction, the data can be reproduced even if part of the data is missing, and therefore, missing packets do not need to be retransmitted, which makes it possible to prevent a traffic burst from occurring. Accordingly, a method according to the RTP is effective in moving image distribution.

According to the moving image distribution method according to the related art, however, a packet which has been lost during the transmission or a packet which has been arrived late is ignored by the reception terminal side as described above, with the result that the image quality is degraded, the reproduction is stopped, or further the image lacks in part thereof, leading to a problem that it is impossible to provide moving image contents of high quality. In particular, according to the related art, the moving image distribution is conducted at the initiative of the server side as described above, that is, the distribution is conducted irrespective of the communications status or the capability of the terminal on the reception side, and therefore the above-mentioned problem becomes increasingly prominent. Specifically, in the case of a fixed terminal, there are various communications methods including optical communications, ADSL, and ISDN, which are different in communications speed, and in the case of a mobile phone, the radio wave condition varies depending on the location thereof, which makes it difficult to realize a stable distribution of moving image.

SUMMARY OF THE INVENTION

The present invention has been made to solve the above-mentioned problems inherent in the related art, and therefore, it is an object of the invention to provide a contents distribution system capable of distributing contents of high quality, to thereby achieve a high level of user satisfaction.

According to another aspect of the present invention, there is provided a contents distribution system including: a contents distribution server for dividing stored contents data into segments and distributing the contents data segments, the contents data being reproducible for a predetermined period of time; and a contents reproduction terminal for receiving and storing the contents data segments distributed by the contents distribution server and reproducing the same in real time, in which: the contents reproduction terminal has a function of notifying the contents distribution server of contents processing information indicating a processing status of the contents data segments distributed; and the contents distribution server has a function of distributing the contents data segments by varying sizes of the contents data segments in accordance with the contents processing information notified by the contents reproduction terminal.

According to another aspect of the present invention, there is provided a contents distribution server for storing contents data reproducible for a predetermined period of time and distributing the contents data by dividing the contents data into segments such that the contents data is reproduced in real time while being received and stored by a contents reproduction terminal, the contents distribution server including: a communications processor for receiving, from the contents reproduction terminal, a notification of contents processing information indicating a processing status of the contents data segments distributed to the contents reproduction terminal; a moving image segmentation processor for creating the contents data segments by varying sizes of contents data segments in accordance with the contents processing information; and a moving image distribution processor for distributing the contents data segments.

According to another aspect of the present invention, there is provided a contents reproduction terminal for receiving and storing contents data segments distributed by a contents distribution server and reproducing the same in real time, in which the contents reproduction terminal notifies the contents distribution server of contents processing information indicating a processing status of the contents data segments distributed.

According to another aspect of the present invention, there is provided a contents distribution method for a contents distribution server which divides and distributes stored contents data reproducible for a predetermined period of time as contents data segments and for a contents reproduction terminal which receives and stores the contents data segments distributed by the contents distribution server and reproduces the contents data segments in real time, the contents distribution method including: notifying, by the contents reproduction terminal, the contents distribution server of contents processing information indicating a processing status of the contents data segments; and creating and distributing, by the contents distribution server, the contents data segments by changing sizes of the contents data segments in accordance with the contents processing information notified by the contents reproduction terminal.

According to the present invention with the above-mentioned structure which functions as described above, a processing status of contents data segment extracted from contents data and distributed by the contents distribution server is notified from the contents reproduction terminal to the contents distribution server, which allows another contents data segment which is to be extracted and distributed later to be created based on the processing status thus notified. Accordingly, the present invention produces an unconventional excellent effect of making it possible to distribute high-quality contents data in a manner that the data can be continuously reproduced with consideration given to a network status or a reproduction status of the contents reproduction terminal, to thereby achieve a high level of user satisfaction.

DETAILED DESCRIPTION OF THE PREFERRED EMBODIMENTS

1. First Exemplary Embodiment

Figure 1:
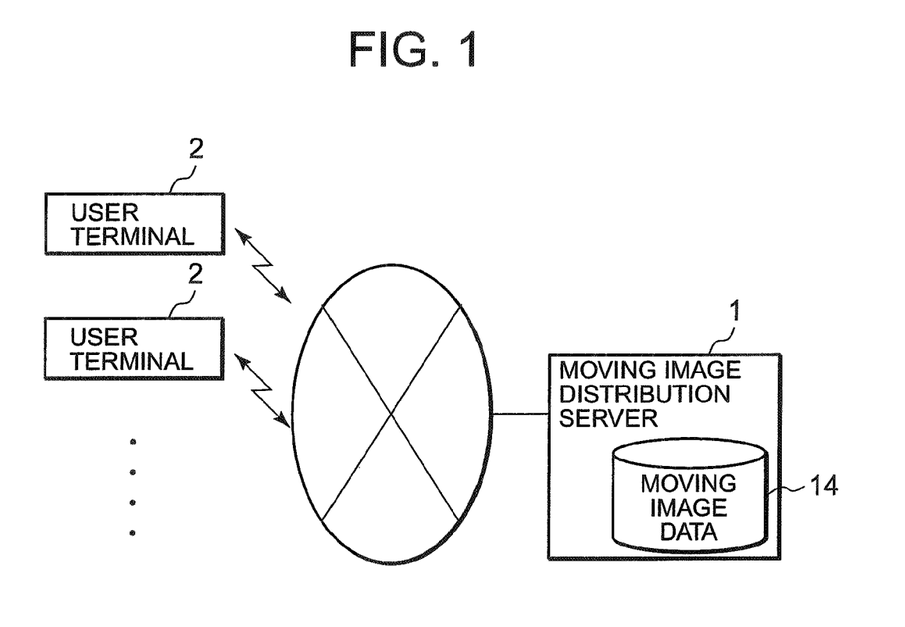
FIG. 1 is a block diagram showing an entire structure of a moving image distribution system according to a first exemplary embodiment of the present invention.
Figure 2:
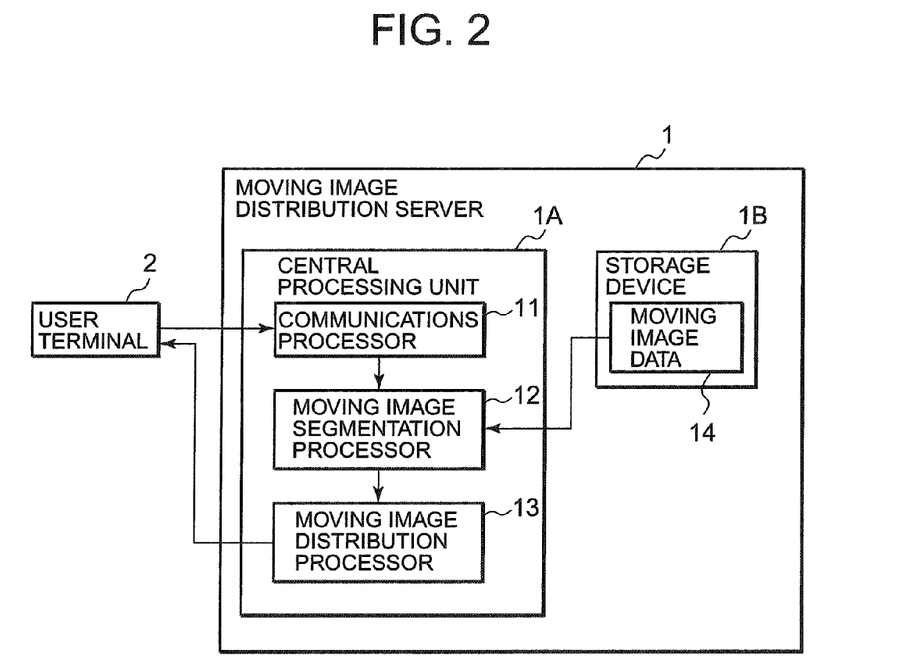
FIG. 2 is a functional block diagram showing a structure of a moving image distribution server according to the first exemplary embodiment.
Figure 3:
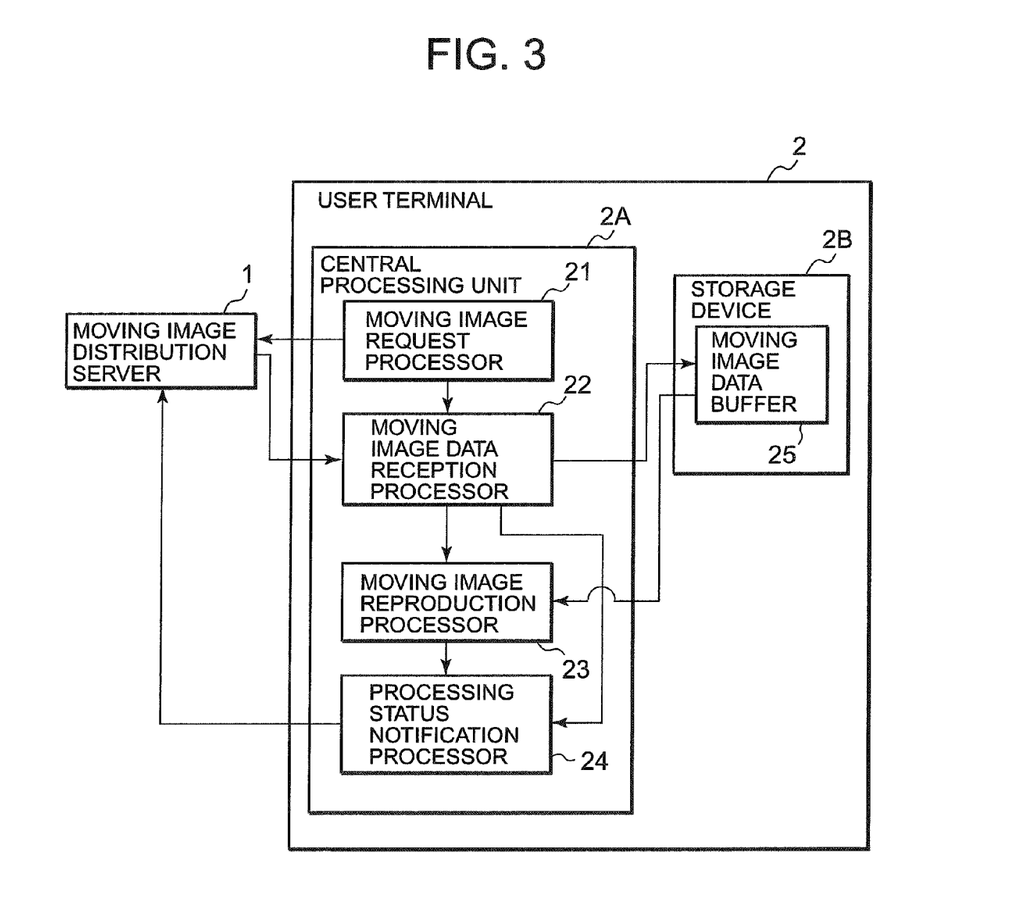
FIG. 3 is a functional block diagram showing a structure of a user terminal according to the first exemplary embodiment.
Figure 4:
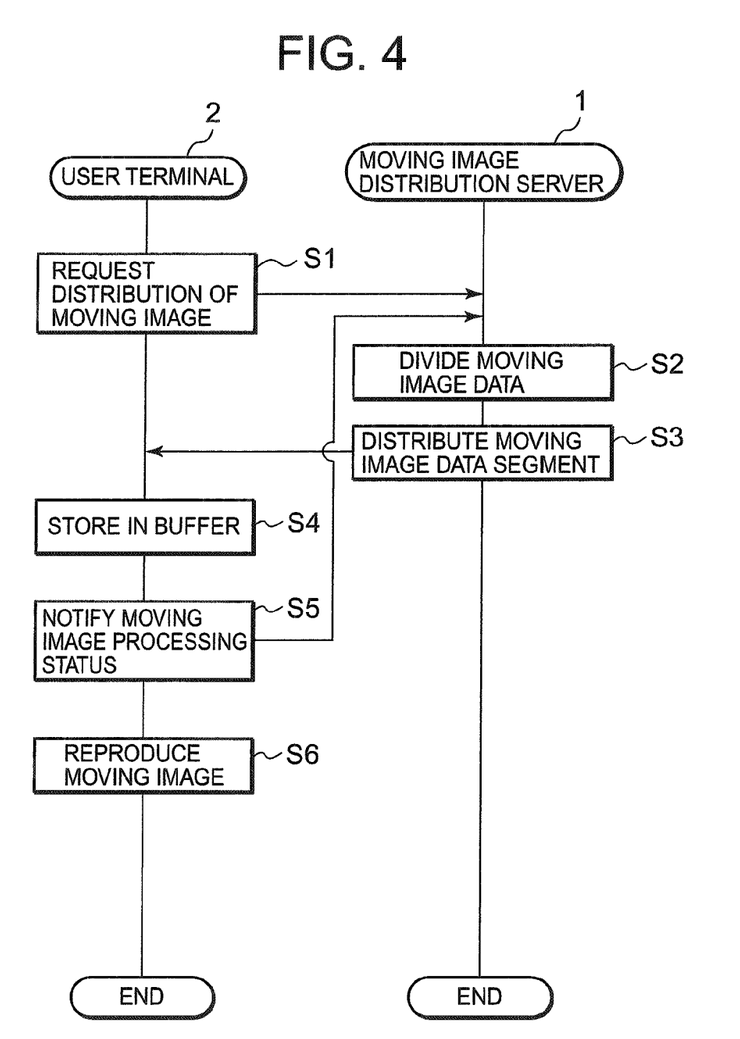
FIG. 4 is a sequence diagram illustrating an operation of the entire system according to the first exemplary embodiment.
Figure 5:
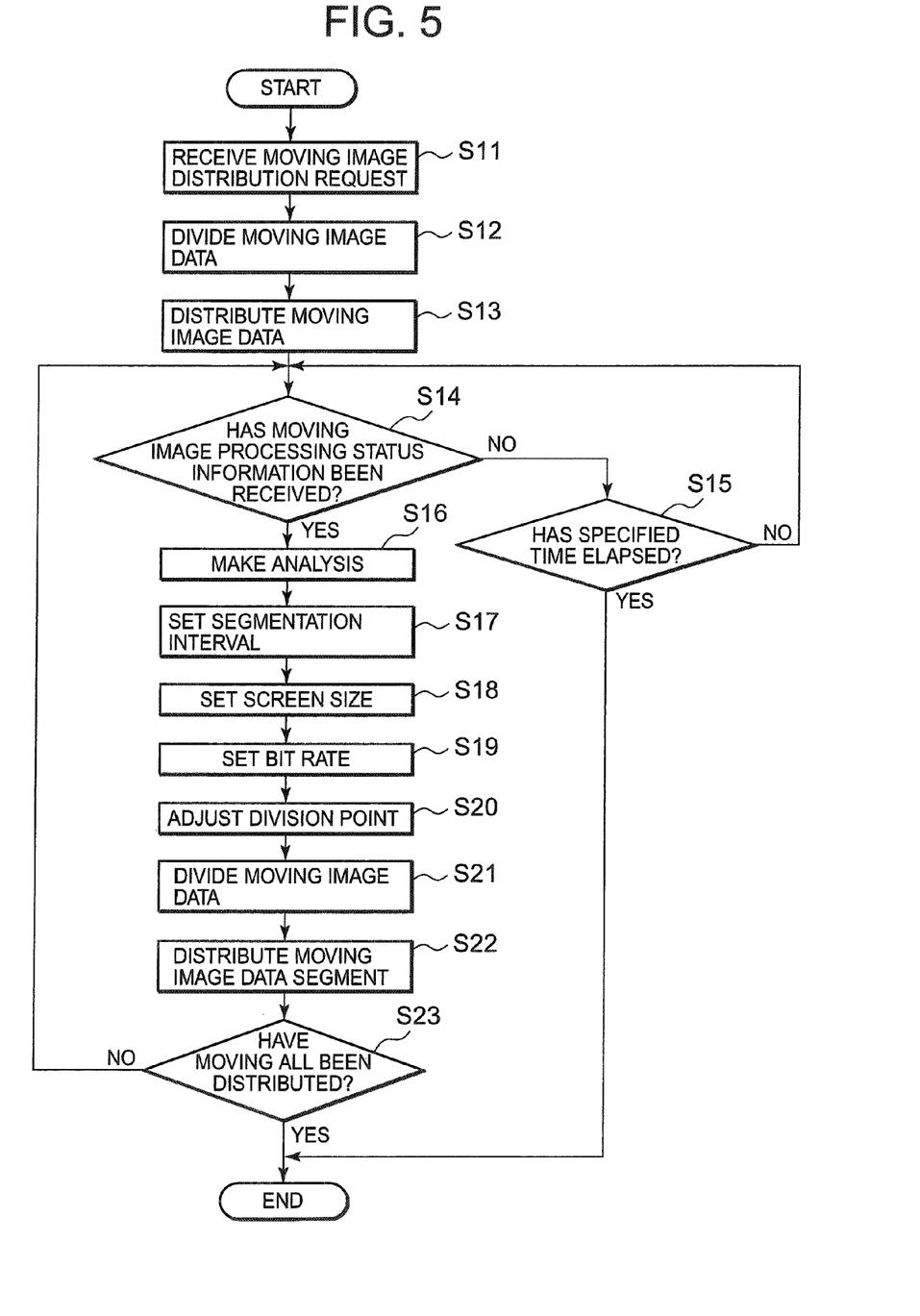
FIG. 5 is a flowchart illustrating an operation of the moving image distribution server according to the first exemplary embodiment.
Figure 6:
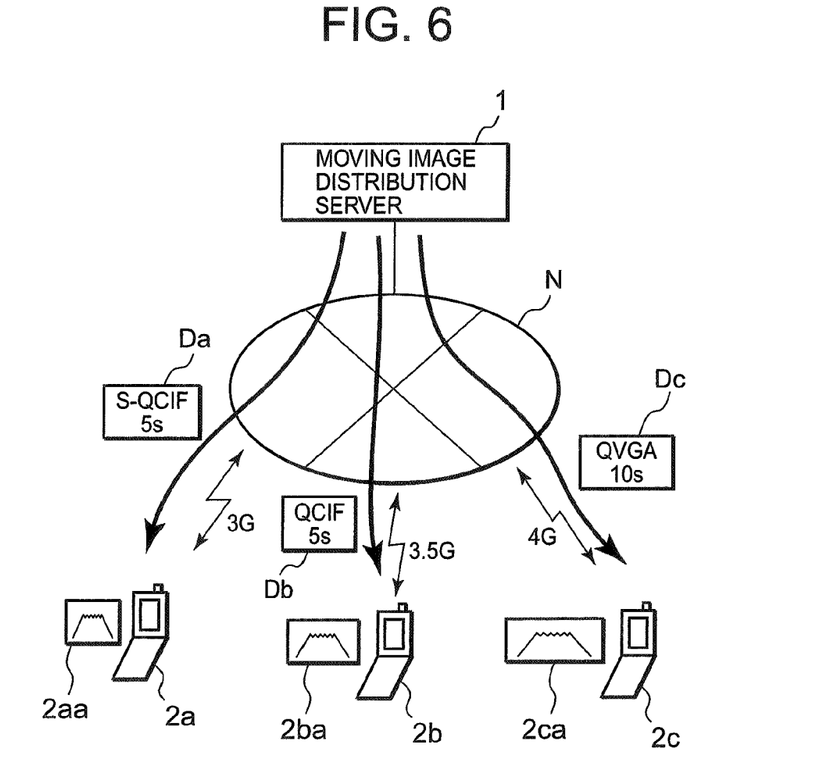
FIG. 6 is a diagram for illustrating how a moving image is distributed according to the first exemplary embodiment.

A first embodiment of the present invention is described with reference to FIGS. 1 to 6. FIG. 1 is a block diagram showing an entire structure of a moving image distribution system. FIG. 2 is a functional block diagram showing a structure of a moving image distribution server, and FIG. 3 is a functional block diagram showing a structure of a user terminal. FIG. 4 is a sequence diagram illustrating an operation of the entire system, and FIG. 5 is a flowchart illustrating an operation of the moving image distribution server. FIG. 6 is a diagram for illustrating how a moving image is distributed.

As shown in FIG. 1, the moving image distribution system (contents distribution system) according to this embodiment includes a moving image data distribution server (contents distribution server) 1 and a user terminal (contents reproduction terminal) 2 which are connected to each other through a network N. The moving image data distribution server 1 stores moving image data (contents data) 14 and distributes the moving image data 14 by dividing the data 14 into segments. The user terminal 2 includes a mobile phone which receives and stores each of the moving image data segments (contents data segments) thus distributed while reproducing the moving image data segment in real time. Hereinbelow, the moving image distribution server 1 and the user terminal 2 are each described in detail.

The user terminal 2 is a mobile phone of general type operated by a user, which is capable of performing data communications by radio, and includes a terminal capable of reproducing moving image data. The user terminal 2 may include an information processing terminal such as a PDA or a laptop computer, or may include a fixed terminal which performs wired communications.

The user terminal 2 has a central processing unit (CPU) 2A which incorporates a predetermined program therein, to thereby construct, as shown in FIG. 3, a moving image request processor 21, a moving image data reception processor 22, a moving image reproduction processor 23, and a processing status notification processor 24. The user terminal 2 also has a storage device 2B such as a flash memory, in which a moving image buffer 25 is formed. The user terminal 2 is further described in more detail as follows.

The moving image request processor 21 has a function of accessing the moving image distribution server 1 and sending information of requesting the moving image distribution. The moving image data reception processing unit 22 has a function of receiving a moving image data segment (contents data segment) including a predetermined one of a plurality of scenes into which one moving image data (contents data) item is divided, the moving image data segment being sent by the moving image distribution server 1 in response to the above-mentioned moving image distribution request, and storing the moving image data segment (contents data segment) into the moving image data buffer 25. The moving image reproduction processor 23 has a function of reproducing the moving image data segment stored in the moving image buffer 25 and displaying the data on a display. Those functions are necessary to perform an operation similar to the conventional streaming distribution.

In addition to the functions of receiving and reproducing the distributed moving image data segment, the user terminal 2 of this embodiment further has a function of notifying the moving image distribution server 1 of moving image processing information (contents processing information) indicating how the moving image data segment is being processed in the user terminal 2 (contents processing information notifying means) Specifically, the moving image data reception processor 22 identifies how the distributed moving image data segment is being received and processed, and notifies the processing status notification processor 24 of the reception and processing status of the moving image data segment. For example, the moving image data reception processor 22 measures a reception time, which indicates how long it takes to complete receiving the distributed moving image data segment having a predetermined data size after starting the reception of the data. Further, the moving image data reception processor 22 checks the header or the like of the received moving image data segment, to thereby obtain a reproduction time of the moving image data segment itself, that is, to determine how many hours (minutes or seconds) are necessary to reproduce the moving image data segment. Then, the processing status notification processor 24 notifies the moving image distribution server 1 through the network N of moving image processing information including information indicating the reception time and the reproduction time obtained as described above. Based on the information thus notified, it is possible to see whether or not the distribution of the moving image data segment distributed from the moving image distribution server 1 takes longer time than the actual reproduction time thereof, and the information thereon can be notified to the moving image distribution server 1.

The moving image processing information to be notified to the moving image distribution server 1 as described above is not limited to the above-mentioned information. For example, a data transmission speed or the like may be obtained based on an entire size of the moving image data segment being received and an actual reception speed (such as a reception capacity per unit time), and the data transmission speed thus obtained may be notified as the moving image processing information to the moving image distribution server 1. Alternatively, a moving image reproduction status in the user terminal 2 may be identified, and the moving image reproduction status thus identified may be included in the moving image processing information to be transmitted. For example, the time necessary to reproduce the received moving image data segment itself and the time actually needed to reproduce the moving image data segment are obtained per predetermined period of time. Specifically, the time necessary to reproduce a moving image data segment which is to be additionally stored in the user terminal 2 and the time actually taken to reproduce the preceding moving image segment of same amount while receiving to store the moving image data segment are obtained, to thereby notify whether or not the moving image data is constantly being stored in the user terminal 2 without running short. It is also possible to determine, based on the reception status and the reproduction status, a storage status of the moving image buffer 25, that is, a size of data to be reproduced and a free space corresponding thereto in the buffer 25, and notify the storage status to the moving image distribution server 1.

In the manner as described above, it is possible to notify the moving image distribution server 1 of the moving image reproduction status which depends on the capability of the user terminal 2 or of the network bandwidth status.

The moving image distribution server (contents distribution server) 1 includes a server computer of general type, and has a function of distributing through streaming moving image data stored therein, in response to a moving image distribution request made by the user terminal 2 through the network N$_n$. A description is given of a structure of the moving image distribution server 1 with reference to FIG. 2.

The moving image distribution server 1 has a central processing unit (CPU) 1A which incorporates a predetermined program therein, to thereby construct a communications processor 11, a moving image segmentation processor 12, and a moving image distribution processor 13. The moving image distribution server 1 also has a storage device 1B such as a hard disk drive, in which moving image data (contents data) 14 is stored. The storage device 1B storing the moving image data 14 may be provided external to the moving image distribution server 1. The moving image data 14 includes moving image contents such as a drama, a movie, a commercial or a music video, which is reproduced for a predetermined period of time.

The communications processor 11 has a function of receiving information transmitted from the user terminal 2 through the network N, and receives, for example, information of requesting the moving image distribution, from the user terminal 2. The communications processor 11 also receives, from the user terminal 2 to which the moving image is distributed, the notification of moving image processing information (contents processing information) indicating a processing status of the moving image data segment distributed (contents processing information reception means). Then, the moving image processing information is passed to the moving image segmentation processor 12.

The moving image segmentation processor 12 analyzes the moving image processing information, and creates a moving image data segment (contents data segment) to be distributed to the user terminal 2. At this time, the moving image processing information includes information indicating how the moving image data segment which has already been distributed is being processed in the user terminal 2, which makes it possible to determine, for example, whether the data is sufficiently distributed so as to be continuously reproduced in the user terminal 2. Then, the moving image segmentation processor 12 creates moving image data segments by dividing the moving image data 14 into segments of different widths, for example, depending on the data processing status in the user terminal 2, and distributes the moving image data segments thus created to the user terminal 2 through the moving image distribution processor 13 (distribution means).

Now, the operation of the moving image segmentation processor 12 is further described in detail. The moving image segmentation processor 12 first analyzes the moving image processing information received, and in a case where the reception time at the user terminal 2 is longer than the reproduction time of the moving image data segment itself or in a case where data has been reproduced in the user terminal 2 for a time period longer than the reproduction time of the moving image data segment received for a predetermined period of time, it may be assumed that there is a delay in the reception of data in the user terminal 2 and the network bandwidth is reduced to be constricted. Based on this information, the moving image segmentation processor 12 divides the moving image data 14 into smaller segments so as to reduce the data size of each moving image data segment, whereby the moving image data segment having a predetermined reproduction time can be distributed to the user terminal 2 even in the above-mentioned case. Specifically, the moving image segmentation processor 12 divides the moving image data 14 such that each moving image data segment is adjusted to have a data size that is small enough to be distributed to the user terminal 2 within a time period equal to or shorter than the reproduction time of the moving image data segment itself. In this manner, the reproduction of the moving image data segment which has already been distributed is not completed until the subsequent moving image data segment arrives at the user terminal 2, and therefore successive moving image data segments can be continuously reproduced without a break in the user terminal 2.

Further, the moving image segmentation processor 12 may change the image quality of each moving image data segment so as to change the data size thereof, when transmitting the moving image data segments to the user terminal 2. Specifically, in a case it has been identified from the moving image processing information that the user terminal 2 is receiving the moving image data segment which has already been distributed in a time period shorter than the reproduction time thereof, and therefore it has been determined that the bandwidth of the network N currently used has enough room to spare, the moving image data is divided by setting the screen size larger or setting the bit rate higher, to thereby create the moving image data segments. Alternatively, in dividing the data, it is also checked whether or not the frames are equally distributed in number to be included per unit reproduction time, based on which it may be adjusted where to divide the data. For example, the data may be divided to create the moving image data segments such that the number of frames included per unit reproduction time does not fall below a predetermined value.

Then, each of the above-mentioned processors 11, 12, and 13 of the moving image distribution server 1 repeatedly performs the above-mentioned process each time the moving image processing information is received from the user terminal 2.

Next, an operation of the moving image distribution system structured as described above is described with reference to FIGS. 4 and 5. First, the user terminal 2 accesses the moving image distribution server 1 and makes a moving image distribution request thereto (Step S1). The moving image distribution server 1, which has received the moving image distribution request (Step S11 of FIG. 5), reads out moving image data and divides the moving image data into a plurality of scenes, to thereby creates moving image data segments (Step S2 of FIG. 4 and Step S12 of FIG. 5). The moving image distribution server 1 then distributes one of the moving image data segments, which corresponds to the first scene, to the user terminal 2 (Step S3 of FIG. 4 and Step S13 of FIG. 5). At this time, with respect to the initial moving image distribution request, the moving image data is divided based on the initial setting value or on the communications setting information notified by the user terminal 2, and distributed.

After that, the user terminal 2 receives the moving image data segment thus distributed and stores the moving image data segment in the buffer 25 (Step S4), and reproduce the segment (Step S6). At this time, the user terminal 2 obtains, based on the reception status or the reproduction status of the data segment, moving image processing information which indicates how the moving image segment is being processed, and notifies the moving image distribution server 1 of the moving image processing information (Step S5). As described above, the moving image processing information includes, for example, information on the time needed to receive the moving image segment which has been distributed immediately before.

Subsequently, if the moving image distribution server 1 receives the moving image processing information within a specified time ("yes" in Step S14 of FIG. 5), the moving image distribution server 1 first analyzes the moving image processing information (Step S16 of FIG. 5). The moving image distribution server 1 checks, for example, whether or not the distribution of the moving image data segment is behind the schedule, based on the reception time included in the moving image processing information. The moving image distribution server 1 also checks whether or not the distribution of the moving image data segment is late, based on the relation between the reception and the reproduction thereof. Then, based on the result of the analysis, a division interval (reproduction time of a moving image data segment), a screen size, a bit rate, a division point, and the like are set (Steps S17 to S20 of FIG. 5), and another moving image segment is created by dividing the subsequent portion of the moving image data (Step S2 of FIG. 4 and Step S21 of FIG. 5). The moving image data segment thus created is distributed to the user terminal 2 (Step S3 of FIG. 4 and Step S22 of FIG. 5). Then, the above-mentioned processes are repeated ("no" in Step S23 of FIG. 5).

Specifically, in a case where it has been determined, as the result of the analysis in Step S16, that the distribution of the moving image data segment which has been distributed immediately before is late, it may be assumed that the network bandwidth is low. Accordingly, the moving image data is set to be divided into segments of smaller width so that the moving image data segments each having a shorter reproduction time with smaller size are distributed at short intervals. Further, the moving image data may be reduced in screen size, or a lower bit rate may be set thereto, to thereby reduce the data size. At the same time, it is necessary to give consideration to where to divide the data, that is, if the width of each segment is too small, the number of frames included in each scene corresponding to each segment may be reduced to be extremely small, so it is necessary to adjust the points to divide the data such that each segment includes a predetermined number of frames.

In the manner as described above, even in the case where the network bandwidth is low, a moving image data segment which has already been distributed to the user terminal 2 is still being reproduced when the user terminal 2 has completed the reception of a subsequent moving image data segment of smaller size, which means that the moving image data can be continuously reproduced without a break. At the same time, it is possible to maintain the quality of the moving image as high as possible.

On the other hand, in a case where it has been determined, as the result of the analysis made on the moving image processing information, that the moving image data segment has been received ahead of schedule and therefore it is assumed that the network bandwidth is high, the moving image data segment may be created and distributed by rather increasing the moving image data in screen size or setting a higher bit rate thereto. In this way, it is possible to distribute the moving image data of high quality to the user terminal 2. Even in this case, however, it is necessary to set the moving image data segments to have a data size such that the moving image data segments can be distributed to the user terminal 2 in such a manner that a moving image data segment which has already been distributed to the user terminal 2 is still being reproduced when the user terminal 2 has completed the reception of a subsequent moving image data segment.

In a case where the moving image processing information has not been received from the user terminal 2 even after a lapse of a specified period of time since the distribution of the moving image data segment ("yes" in Step 15 of FIG. 5), or in a case where the distribution of all the moving images has been completed ("yes" in Step S23 of FIG. 5), the moving image distribution server 1 ends the moving image distribution.

FIG. 6 shows an operation for distributing moving images to user terminals 2a, 2b, and 2c each having different network bandwidth. In FIG. 6, the user terminal denoted by reference symbol 2a is a 3G (third-generation) mobile phone, and the user terminal denoted by reference symbol 2b is a 3.5G mobile phone capable of communicating at higher speed. The user terminal denoted by reference symbol 2c is a 4G (fourth-generation) mobile phone capable of communicating at speed higher than that of the optical communications.

Even in a case where the moving image distribution is requested by a plurality of user terminals 2a to 2c having different communication speeds as described above, the moving image data segment is set to have a size in accordance with the data transmission capacities (bandwidths) of the user terminals 2a to 2c or in accordance with the processing capabilities of the user terminals, and the moving data segment thus set is distributed. For example, the mobile phone denoted by reference symbol 2a has a lower transmission speed, and therefore a moving image data segment of small size denoted by reference symbol Da in which the screen size is set small to be S-QCIF and the reproduction time is set short to be 5 seconds is distributed, and a moving image is reproduced in a small screen denoted by reference symbol 2aa. Meanwhile, the mobile phone denoted by reference symbol 2b has a relatively high transmission speed, and therefore a moving image data segment of larger size denoted by reference symbol Db in which the screen size is set one size larger to be QCIF and the reproduction time is set to be 5 seconds is distributed, and a moving image is reproduced in a screen denoted by reference symbol 2ba. Further, the mobile phone denoted by reference symbol 2c has a further higher transmission speed, and therefore a moving image data segment of further larger size denoted by reference symbol Dc in which the screen size is set large to be QVGA and the reproduction time is set long to be 10 seconds is distributed, and a moving image is reproduced in a large screen denoted by reference symbol 2ca.

In any of those cases, the moving image data segments are set such that the moving image data segments can be distributed in such a manner that a moving image data segment which has already been distributed is still being reproduced when a subsequent moving image data segment is distributed, and therefore, it is possible to continuously reproduce the moving image data segments without a break.

It has been described in the above an exemplary case where the user terminal 2 is a mobile phone. The present invention, however, is similarly applied to a case where the user terminal 2 includes a plurality of fixed terminals which use networks different in communication speed.

Figure 7:
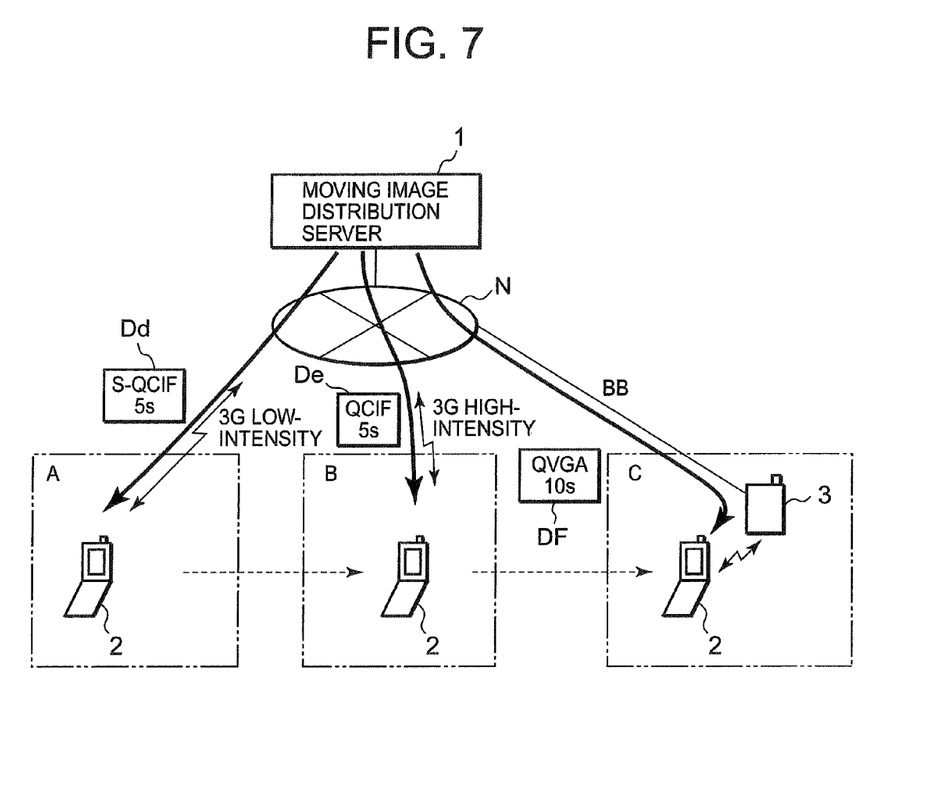
FIG. 7 is a diagram for illustrating how a moving image is distributed according to a second exemplary embodiment of the present invention.

A second embodiment of the present invention is described with reference to FIG. 7. FIG. 7 illustrates the movement of one user terminal 2 when receiving the distribution of moving images. The user terminal 2 in this case is a 3G mobile phone.

First, in a case where the user terminal 2 is located in a place denoted by reference symbol A where low-intensity radio waves are received, which means that the communications bandwidth is low, the user terminal 2 notifies the moving image distribution server 1 of moving image processing information so as to inform that the reception of the moving image data segment is being late. In response to this, the moving image distribution server 1 distributes moving image data segments of smaller size as denoted by reference symbol Dd, which enables the user terminal 2 to continuously reproduce the moving image without a break.

After that, in a case where the user terminal 2 has moved to be located in a place denoted by reference symbol B where high-intensity radio waves are received, the user terminal 2 notifies with moving processing information that the reception of moving image data segments is in time and the data transmission has enough room to spare. In response to this, the moving image distribution server 1 distributes moving image data segments of larger size as denoted by reference symbol De, which enables the user terminal to continuously reproduce a moving image of higher quality.

Then, in a case where the user terminal 2 has further moved to be located in a place denoted by reference symbol C to which a broadband network is connected and the user terminal 2 is capable of connecting to the broadband network through a communications device 3 such as a router or the like, the user terminal 2 notifies with moving image processing information that the data transmission still has enough room to spare. In response to this, the moving image distribution server 1 can distribute a moving image data segment of further larger size as denoted by reference symbol Df, which enables the user terminal 2 to continuously reproduce a moving image of further higher quality.

As described above, according to the present invention, the moving image 1 is capable of recognizing the current situations of the user terminal 2 to which the moving image data is distributed and of the network to which the user terminal 2 is connected, and of creating the moving image data segment according to the situations and distribute the moving image data segment thus created, which makes it possible to distribute a moving image to the user terminal 2 according to the status thereof such that the moving image can be continuously reproduced with high quality, to thereby achieve a high level of user satisfaction in viewing the moving image.

The contents data according to the present invention, which is distributed from a server to be reproduced in the terminal, is not limited to moving image data, and may include data such as music data which is reproduced for a predetermine period of time.

The present invention is applicable to a contents distribution server of a contents service provider or a telecommunications carrier which performs contents distribution, and further to a mobile phone receiving the distribution of contents which is operated by a user, and therefore has industrial applicability.

The previous description of these embodiments is provided to enable a person skilled in the art to make and use the present invention. Moreover, various modifications to the embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

What is claimed is:

1. A contents distribution system, comprising:
   means for dividing contents data stored in a contents distribution server into segments and distributing the contents data segments, the contents data being reproducible for a predetermined period of time;
   means for distributing the contents data segments by varying sizes of the contents data segments in accordance with contents processing information notified by a contents reproduction terminal;
   means for receiving and storing the contents data segments distributed by the contents distribution server and reproducing the same in real time; and
   means for notifying the contents distribution server of the contents processing information indicating a processing status of the contents data segments distributed;
   wherein the means for distributing creates the contents data segments in accordance with the contents processing information, such that each of the contents data segments is distributed within the reproduction time of the contents data segments itself.

2. A contents distribution system, comprising:
   a contents distribution server for dividing stored contents data into segments and distributing the contents data segments, the contents data being reproducible for a predetermined period of time; and
   a contents reproduction terminal for receiving and storing the contents data segments distributed by the contents distribution server and reproducing the same in real time, wherein:
   the contents reproduction terminal has a function of notifying the contents distribution server of contents processing information indicating a processing status of the contents data segments distributed; and
   the contents distribution server has a function of distributing the contents data segments by varying sizes of the contents data segments in accordance with the contents processing information notified by the contents reproduction terminal;
   wherein the contents distribution server creates the content data segments in accordance with the contents processing information, such that each of the contents data segments is distributed to the contents reproduction terminal within the reproduction time of the contents data segments itself.

3. A contents distribution server, comprising:
   means for storing contents data reproducible for a predetermined period of time and means for distributing the contents data by dividing the contents data into segments such that the contents data is reproduced in real time while being received and stored by the contents reproduction terminal;
   means for receiving, from the contents reproduction terminal, a notification of contents processing information indicating a processing status of the contents data segments distributed to the contents reproduction terminal;

means for creating the contents data segments by varying sizes of contents data segments in accordance with the contents processing information; and means for distributing the contents data segments;

wherein the means for distributing creates the contents data segments in accordance with the contents processing information such that each of the contents data segments is distributed to the contents reproduction terminal within the reproduction time of the contents data segments itself.

4. A contents distribution server for storing contents data reproducible for a predetermined period of time and distributing the contents data by dividing the contents data into segments such that the contents data is reproduced in real time while being received and stored by a contents reproduction terminal, the contents distribution server comprising:

a communications processor for receiving, from the contents reproduction terminal, a notification of contents processing information indicating a processing status of the contents data segments distributed to the contents reproduction terminal;

a moving image segmentation processor for creating the contents data segments by varying sizes of contents data segments in accordance with the contents processing information; and a moving image distribution processor for distributing the contents data segments;

wherein the moving image segmentation processor creates the contents data segments in accordance with the contents processing information such that each of the contents data segments is distributed to the contents reproduction terminal within the reproduction time of the contents data segments itself.

5. A contents distribution server according to claim 4, wherein the contents processing information includes information indicating a reception and processing status of the contents data segments in the contents reproduction terminal.

6. A contents distribution server according to claim 4, wherein the contents processing information includes information indicating a reception time needed by the contents reproduction terminal to receive the contents data segment and a reproduction time needed to reproduce the contents data segment itself.

7. A contents distribution server according to claim 4, wherein the contents processing information includes information indicating a reproduction and processing status of the contents data segments in the contents reproduction terminal.

8. A contents distribution server according to claim 4, wherein the contents processing information includes information indicating a reproduction time of the contents data segment itself received by the contents reproduction terminal and a time needed to reproduce the contents data segment stored in the contents reproduction terminal, within a predetermined period of time.

9. A contents distribution server according to claim 4, wherein the contents processing information includes information indicating a storage status of the contents data segments in the contents reproduction terminal.

10. A contents distribution server according to claim 4, wherein the moving image segmentation processor creates the contents data segments in accordance with the contents processing information such that the successive contents data segments are continuously reproduced in the contents reproduction server.

11. A contents distribution server according to claim 4, wherein the moving image segmentation processor creates the contents data segments by changing a quality of the contents data in accordance with the contents processing information.

12. A contents distribution server according to claim 4, wherein the moving image segmentation processor creates, in a case where the contents data includes moving image data, the contents data segments by changing a screen size of the contents data in accordance with the contents processing information.

13. A contents distribution server according to claim 4, wherein the moving image segmentation processor creates the contents data segments by changing a bit rate of the contents data in accordance with the contents processing information.

14. A contents reproduction terminal, comprising:

means for receiving and storing a contents data segment and reproducing the same in real time, the contents data segment being created from contents data reproducible for a predetermined period of time which is divided and distributed by a contents distribution server;

means for varying sizes of the contents data segments in accordance with contents processing information indicating a processing status of the contents data segments distributed; and means for notifying the contents distribution server of the contents processing information;

the contents data segments being created in accordance with the contents processing information such that each of the contents data segments is distributed to the contents reproduction terminal within the reproduction time of the contents data segments itself.

15. A contents reproduction terminal comprising a central processing unit (CPU), for receiving and storing contents data segments distributed by a contents distribution server and reproducing the same in real time, wherein sizes of the contents data segments are varied in accordance with contents processing information indicating a processing status of the contents data segments distributed; and wherein the contents reproduction terminal notifies the contents distribution server of contents processing information; and wherein the contents distribution server creates the contents data segments in accordance with the contents processing information such that each of the contents data segments is distributed to the contents reproduction terminal within the reproduction time of the contents data segments itself.

16. A contents reproduction terminal according to claim 15, wherein the contents processing information includes information indicating a reception and processing status of the contents data segments.

17. A contents reproduction terminal according to claim 15, wherein the contents processing information includes information indicating a time needed to receive the contents data segment itself and a time needed to reproduce the contents data segment.

18. A contents reproduction terminal according to claim 15, wherein the contents processing information includes information indicating a reproduction and processing status of the contents data segments.

19. A contents reproduction terminal according to claim 15, wherein the contents processing information includes information indicating a reproduction time of the contents data segment itself received by the contents reproduction terminal and a time needed to reproduce the contents data segment stored in the contents reproduction terminal, within a predetermined period of time.

20. A contents reproduction terminal according to claim 15, wherein the contents processing information includes information indicating a storage status of the contents data segments.

21. A contents distribution method for a contents distribution server which divides and distributes stored contents data reproducible for a predetermined period of time as contents data segments and for a contents reproduction terminal which receives and stores the contents data segments distributed by the contents distribution server and reproduces the contents data segments in real time, the contents distribution method comprising:
  notifying, by the contents reproduction terminal, the contents distribution server of contents processing information indicating a processing status of the contents data segments; and
  creating and distributing, by the contents distribution server, the contents data segments by varying sizes of the contents data segments in accordance with the contents processing information notified by the contents reproduction terminal;
  wherein the creating the contents data segments comprises creating the contents data segments in accordance with the contents processing information such that each of the contents data segments is distributed to the contents reproduction terminal within the reproduction time of the contents date segments itself.

* * * * *

UNITED STATES PATENT AND TRADEMARK OFFICE
CERTIFICATE OF CORRECTION

| | |
|---|---|
| PATENT NO. | : 8,448,213 B2 |
| APPLICATION NO. | : 11/775024 |
| DATED | : May 21, 2013 |
| INVENTOR(S) | : Yasuaki Sumiyoshi |

Page 1 of 1

It is certified that error appears in the above-identified patent and that said Letters Patent is hereby corrected as shown below:

In the Specification

Column 5, Line 28: Delete "$N_n$" and insert -- $N$. --

In the Claims

Column 13, Line 30: In Claim 21, delete "date" and insert -- data --

Signed and Sealed this
Twenty-eighth Day of October, 2014

Michelle K. Lee
*Deputy Director of the United States Patent and Trademark Office*